United States Patent
Fromm et al.

(10) Patent No.: US 10,279,456 B2
(45) Date of Patent: May 7, 2019

(54) SPRING LOADED SUCTION CUP ARRAY GRIPPER

(71) Applicant: XEROX CORPORATION, Norwalk, CT (US)

(72) Inventors: Paul M Fromm, Rochester, NY (US); Jeffrey J Bradway, Rochester, NY (US); Erwin Ruiz, Rochester, NY (US); Linn C Hoover, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 150 days.

(21) Appl. No.: 15/477,427

(22) Filed: Apr. 3, 2017

(65) Prior Publication Data

US 2018/0281305 A1    Oct. 4, 2018

(51) Int. Cl.
   *B25B 11/00*    (2006.01)
   *B33Y 30/00*    (2015.01)
   *B29C 64/20*    (2017.01)

(52) U.S. Cl.
   CPC ............ *B25B 11/005* (2013.01); *B29C 64/20* (2017.08); *B33Y 30/00* (2014.12)

(58) Field of Classification Search
   USPC ................................ 269/20, 21, 65, 266, 329
   See application file for complete search history.

(56) References Cited

U.S. PATENT DOCUMENTS

| | | | | |
|---|---|---|---|---|
| 4,088,312 A * | 5/1978 | Frosch | ................... | B23Q 1/035 269/21 |
| 4,684,113 A * | 8/1987 | Douglas | ................. | B23Q 1/035 269/21 |
| 5,984,293 A * | 11/1999 | Abrahamson | .......... | B23Q 1/035 269/236 |
| 6,250,619 B1 * | 6/2001 | Cook | ..................... | B23Q 1/035 269/20 |
| 8,136,802 B2 * | 3/2012 | Cho | ........................ | B65G 47/91 248/205.9 |
| 8,469,345 B2 * | 6/2013 | Samac | ..................... | B23Q 3/06 269/21 |

* cited by examiner

*Primary Examiner* — Joseph J Hail
*Assistant Examiner* — Shantese L McDonald

(57) ABSTRACT

A universal object holding mechanism for holding three-dimensional objects for printing thereon uses an array of suction cups reciprocally connected to a vacuum box to acquire objects from a staging platen while in a horizontal position and then pivot into a vertical position for movement of the objects past print heads. A plenum connected to the vacuum box is valve controlled to allow a low flow rate to the vacuum box to acquire objects and then a high flow rate pulse to close off all un-sealed suction cups with ball valves.

20 Claims, 5 Drawing Sheets

SPRING LOADED SUCTION CUP ARRAY GRIPPER

CROSS REFERENCE TO RELATED APPLICATIONS

Cross-referenced is commonly assigned U.S. application Ser. No. 15/477,125, filed Apr. 3, 2017, and entitled VACUUM TUBE OBJECT CLAMPING ARRAY WITH CONFORMABLE PADS by Timothy P. Foley et al; U.S. application Ser. No. 15/477,127, filed Apr. 3, 2017, and entitled APPARATUS FOR HOLDING DURING THREE-DIMENSIONAL (3D) OBJECTS DURING PRINTING THEREON by Jeffrey J. Bradway et al; U.S. Publication No. 2018-0282086, and entitled UNIVERSAL PART GRIPPER WITH CONFORMABLE TUBE GRIPPERS by Linn C. Hoover et al; U.S. Application Ser. No. 62/480,563, filed Apr. 3, 2017, and entitled UNIVERSAL OBJECT HOLDER FOR 3-D PRINTING USING A CONFORMABLE GRIPPER BALL by Erwin Ruiz et al; U.S. Publication No 2018-0281306, and entitled UNIVERSAL PART GRIPPER USING 3-D PRINTED MOUNTING PLATE by Linn C. Hoover et al; U.S. Publication No. 2018-0281199, and entitled APPARATUS FOR GENERAL OBJECT HOLDING DURING PRINTING USING MULTIPLE CONFORMABLE BALLS by Jeffrey J. Bradway et al; U.S. and entitled AIR PRESSURE LOADED MEMBRANE AND PIN ARRAY GRIPPER by Paul M. Fromm et al; U.S. Publication No. 2018-0281464, filed Apr. 3, 2017, entitled APPARATUS FOR REPEATABLE STAGING AND HOLDING OBJECTS IN A DIRECT TO OBJECT PRINTER USING AN ARRAY OF PINS by Jeffrey J. Bradway et al; and U.S. Pat. No. 10,086,518, issued Oct. 2, 2018, and entitled SPRING LOADED IRIS MECHANISM STACK GRIPPER by Paul M. Fromm et al; all of which are included in their entirety herein by reference.

TECHNICAL FIELD

This disclosure relates generally to a system for printing on three-dimensional (3-D) objects, and more particularly, to an apparatus adapted for general object holding in a non-production environment.

BACKGROUND

Commercial article printing typically occurs during the production of the article. For example, ball skins are printed with patterns or logos prior to the ball being completed and inflated. Consequently, a non-production establishment, such as a distribution site, which customizes products, for example, in region in which potential product customers support multiple professional or collegiate teams, needs to keep an inventory of products bearing the logos of the various teams. Ordering the correct number of products for each different logo to maintain the inventory can be problematic.

One way to address these issues in non-production outlets would be to keep unprinted versions of the products, and print the patterns or logos on them at the distribution site. Adapting known printing techniques, such as two-dimensional (2-D) media printing technology, to apply image content onto 3-D objects would be difficult. Since the surfaces to be printed must be presented to the printheads as relatively flat, two-dimensional surfaces, the objects have to be maneuvered carefully to present portions of the articles as parallel planes to the printheads.

One Direct-to-Object printing system that accomplishes this is disclosed in copending and commonly assigned U.S. patent application Ser. No. 15/163,880, filed on May 25, 2016, and entitled SYSTEM FOR PRINTING ON THREE-DIMENSIONAL (3D) OBJECTS by Wayne A. Buchar et al. This printing system includes a plurality of printheads arranged in a 2-D array, each printhead being configured to eject marking material, a support member positioned to be parallel to a plane formed by the two-dimensional array of printheads, a member movably mounted to the support member, an actuator operatively connected to the movably mounted member to enable the actuator to move the moveably mounted member along the support member, an object holder configured to mount to the movably mounted member to enable the object holder to pass the array of printheads as the moveably mounted member moves along the support member, and a controller operatively connected to the plurality of printheads and the actuator, the controller being configured to operate the actuator to move the object holder past the array of printheads and to operate the plurality of printheads to eject marking material onto objects held by the object holder as the object holder passes the array of printheads. This application is included herein by reference to the extent necessary to the practice the present disclosure and in its entirety.

A problem with this approach is that it requires a unique part holder for each part that is to be printed. The part holders are currently machined metal brackets with dedicated locating and fastening features machined into each holder. This limits the ability of an operator to print onto general objects brought by an end user.

SUMMARY

In answer to this shortcoming, disclosed is a universal holder for many types of objects. The universal holder includes an array of suction cups to acquire and hold an object to be printed. The object is first staged on a platform for the suction cups to acquire the part. The staging plate allows for repeatable reloading and rapid acquisition of new parts. Selective suction cups and at least one valve connect a vacuum box to a plenum to allow low flow rate application of vacuum to the vacuum box to acquire the object and then a high flow rate pulse to close off all un-sealed tube mounted suction cups by way of the at least one valve. The suction cups are configured to conform to the whole object. A locking plate is then moved into position to secure the tubes in place.

BRIEF DESCRIPTION OF THE DRAWINGS

The foregoing aspects and other features of a printing system that prints images on 3-D objects are explained in the following description, taken in connection with the accompanying drawings.

DETAILED DESCRIPTION

Figure 1:
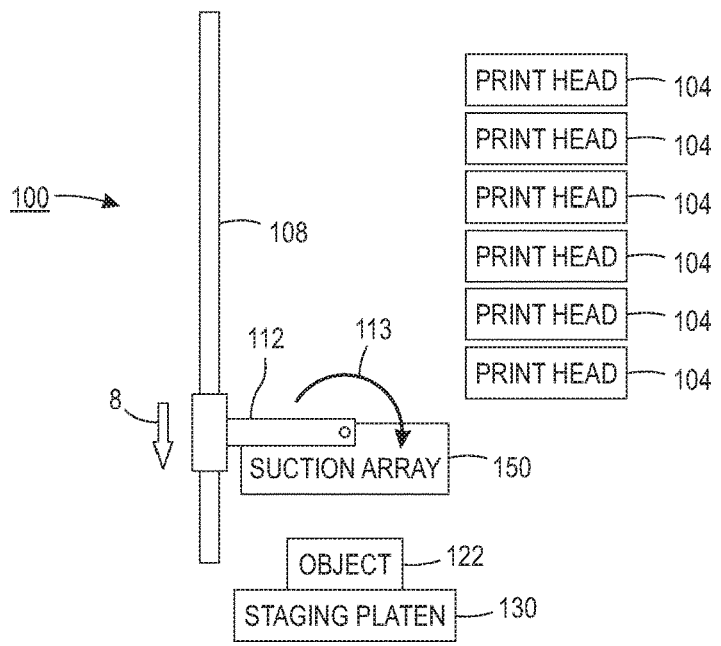
FIG. 1 illustrates an exemplary partial block printing system 100 configured to print on a 3-D object held by a universal object holder that includes a suction array in an object capturing position.

For a general understanding of the present embodiments, reference is made to the drawings. In the drawings, like reference numerals have been used throughout to designate like elements.

FIG. 1 illustrates an exemplary printing system 100 configured to print on a 3-D object. The printing system 100 includes an array of printheads 104, a support member 108, a member 112 movably mounted to the support member 108 to be moved in the direction of arrow 8 in FIG. 1 and arrow 9 in FIG. 2 and a universal object holder 150 configured to pivotally mount to the movably mounted member 112 and adapted to rotate in the direction of arrow 113 to pick up an object. As shown in FIG. 1, the array of printheads 104 is arranged in a two-dimensional array, which in the figure is a 6×1 array, although other array configurations can be used. Each printhead is fluidly connected to a supply of marking material (not shown) and is configured to eject marking material received from the supply. Some of the printheads can be connected to the same supply or each printhead can be connected to its own supply so each printhead can eject a different marking material.

The support member 108 is positioned to be parallel to a plane formed by the array of printheads and, as shown in the figure, is oriented so one end of the support member 108 is at a higher gravitational potential than the other end of the support member. This orientation enables the printing system 100 to have a smaller footprint than an alternative embodiment that horizontally orients the array of printheads and configures the support member, movably mounted member, and object holder to enable the object holder to pass objects past the horizontally arranged printheads so the printheads can eject marking material downwardly on the objects.

Figure 2:
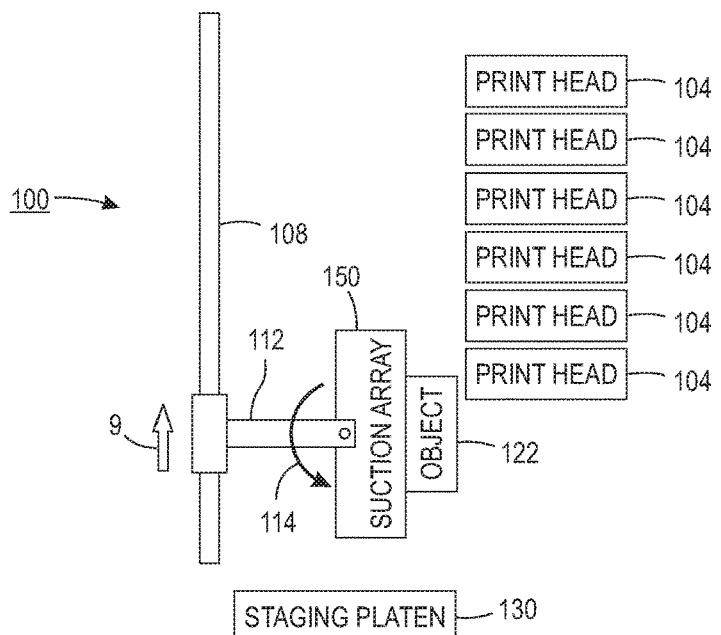
FIG. 2 illustrates the exemplary partial block printing system 100 in FIG. 1 with the suction array in position to receive printing.

The member 112 is movably mounted to the support member 108 to enable the member to slide bi-directionally along the support member. In FIG. 1, the universal object holder 150 has been rotated by member 112 through conventional means into a first position or object acquiring positioned that is parallel to staging platen 130. Object 122 has been positioned onto staging platen 130 for acquisition. In FIG. 2, object 122 has been acquired and suction array 150 has been rotated in the direction of arrow 114 into a second position relative to member 112 and member 112 now moves object 122 along the length dimension of the array of printheads 104 by conventional means, such as, with the use of pulleys and belts or a screw drive.

The system configuration shown in FIG. 1 is especially advantageous in a number of aspects. For one, as noted above, the vertical configuration of the array of printheads 104 and the support member 108 enables the system 100 to have a smaller footprint than a system configured with a horizontal orientation of the array and support member. This smaller footprint of the system enables the system 100 to be housed in a single cabinet and installed in non-production outlets. Once installed, a universal or general object holder, as described further below, can be used with the system to print a variety of goods that are generic in appearance until printed.

Figure 3:
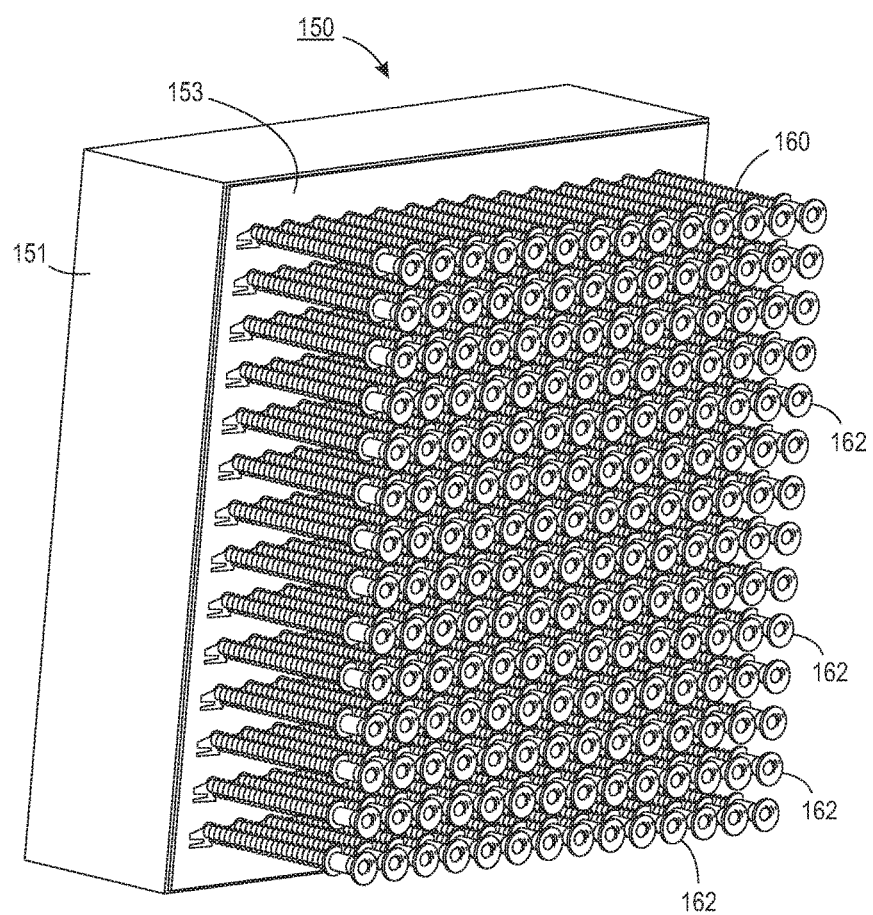
FIG. 3 shows the universal object holder of FIG. 1 including a high density array of suction tubes.

Turning now to the present disclosure, a generic or universal object holder 150 in FIG. 3 includes a suction array 150 having a high density of suction tubes 160. The suction array 150 comprises a vacuum box 151 with a locking plate 153 attached to a bottom portion thereof for stabilizing the suction tubes once an object has been acquired. Suction tubes 160 are adapted to be attached to objects to be acquired and extend from vacuum box 151 and have bellows and suction cups 162 attached to outermost ends thereof for engagement with an object. The bellows like feature allow the suction cup to deform and self-align to the contour of an object whose surface is not perpendicular to the suction tube. In the example shown, vacuum box 151 includes an array of 14×14 of 10 mm diameter suction cups 162 that are capable of holding small objects like a bottle cap or a pen to much larger objects about 200×200 mm. Variable density and diameters can also be used with small closely spaced suction cups in the middle of the vacuum box surrounded by larger and farther apart suction cups.

Figure 4:
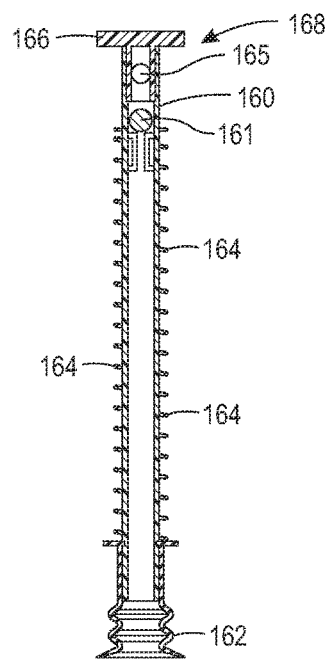
FIG. 4 depicts cross-sectional details of a suction tube used in the suction array shown in FIG. 3.
Figure 5:
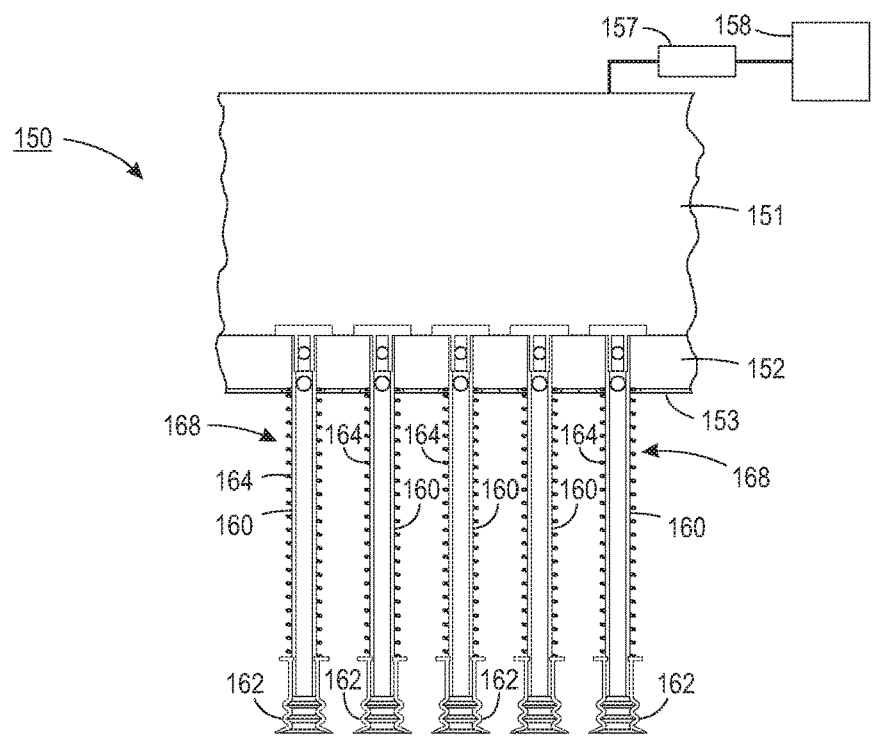
FIG. 5 is a cross-sectional view showing suction tubes positioned within a vacuum box.

FIG. 4 shows hollow suction tube assembly 168 in a home or extended position surrounded by spring 164. Tube assembly 168 includes a rigid tube 160 and a suction cup 162 at an end thereof that is contacted by a retaining ring in a groove (not shown) in tube 160 and spring 164 contacts the other side of the retaining ring. At an opposite end, suction tube 160 is closed by an upper cap member 166 that has an opening 165 therein. A ball 161 rests on a seat portion of suction tube 160 below cap member 166 and is adapted to seal opening 165 by sealing the opening in the lower portion of cap member 166 when a requisite high flow rate vacuum is applied through the suction tube. As shown in FIG. 5, suction tube assemblies 168 are positioned in sealed vacuum box 151 that is connected to a plenum 158, which is held at a low negative gauge pressure of 11.8 psi. A bottom plate 152 is attached to the vacuum box. Suction tube assemblies 168 are shown fully extended with air holes 165 blocked by bottom plate 152. When suction tube assemblies 168 are pushed up by an object and vacuum is applied at a low flow rate air will move out of the holes at the top of the suction tubes causing suction cups 162 to begin sealing around the object. After most of the suction cups have sealed to the object, the vacuum flow rate is increased causing moving air to lift ball 161 in any suction tubes that are not sealed. Suction assemblies 168 that are pushed up out of bottom plate 152 to unseal hole 165 may not seal themselves against the object due to many reasons, such as, partial contact to the object or groove or texture on the object surface that provide significant air leak. A variable valve 157, or two valves, connect vacuum box 151 to a plenum 158 to allow low flow rate application of vacuum to the vacuum box to acquire the object and then a high flow rate pulse to close off all un-sealed suction cups due to movement of the balls 161. The balls seal against upper caps 166. Suction cups 162 are configured bellows-like to allow the suction cups to alight to the object surface.

Figure 6:
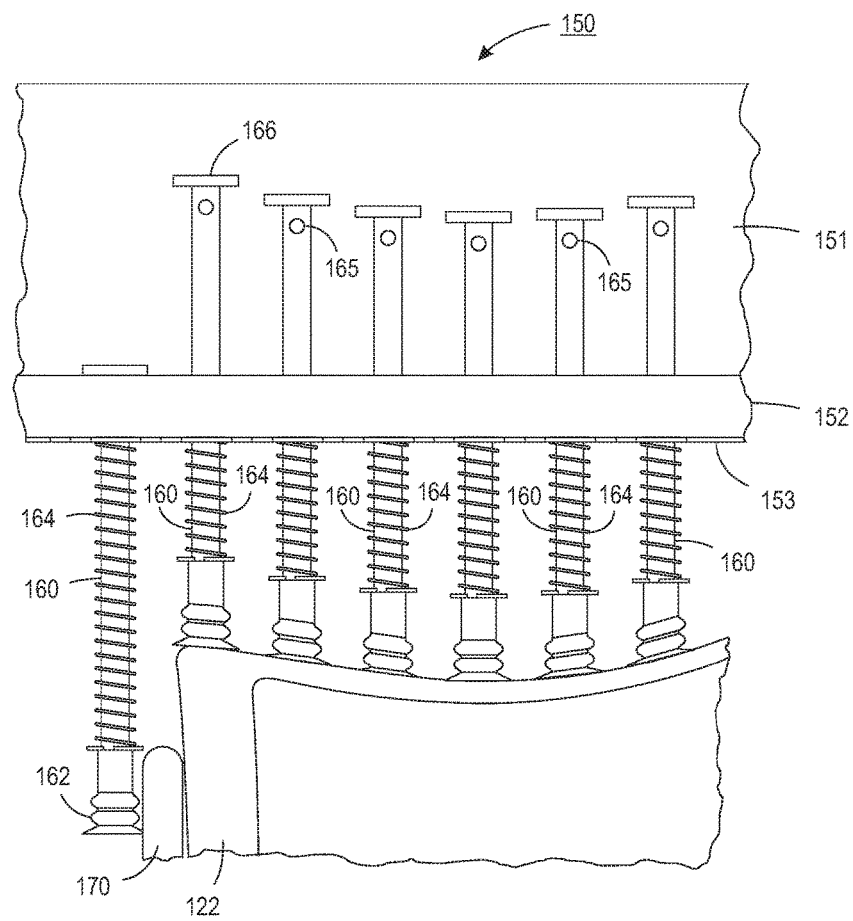
FIG. 6 shows the suction array of FIG. 5 acquiring an object to be printed upon.
Figure 7:
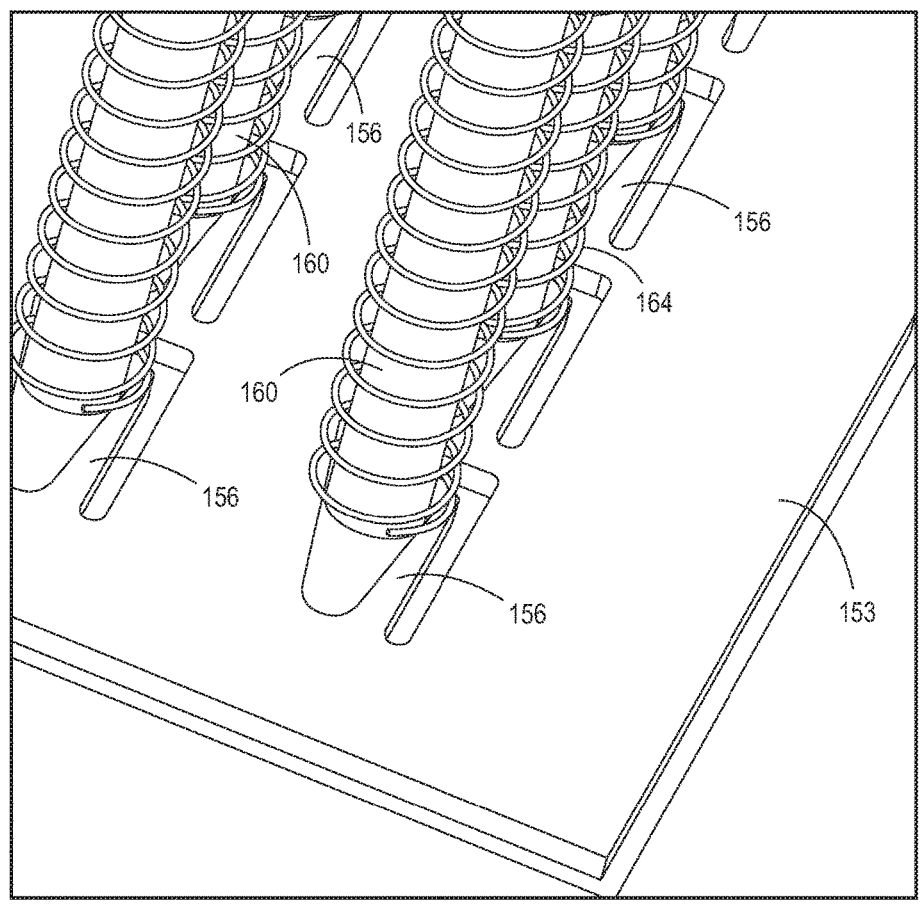
FIG. 7 depicts a bottom view of a locking plate that rigidizes the suction sticks after vacuum is applied.

In practice, an object 122 is shown being acquired in FIG. 6 by pushing vacuum box 151 and suction array 150 down against object 122. In doing so, suction cups 162 contact object 122 and align themselves to the object. The suction tube assemblies 168 then stop moving as vacuum box 151 continues to move down. Vacuum box 151 then stops moving when suction cups 162 are at a predetermined location with respect to staging or alignment platen 130 in FIG. 1. Vacuum is applied at a low flow rate until most of the suction cups have sealed to object 122 and then the vacuum flow rate is increased causing moving air to lift the balls 161 shown in FIG. 4 against cap members 166 in any suction tubes that are not sealed. A locking plate 153, as shown clearly in FIG. 7, rigidizes each suction tube after vacuum is applied to prevent movement. Locking plate 153 includes compliant fingers 156 that can move slightly relative to the whole locking plate 153 to allow for manufacturing variation of all of the parts. The whole locking plate is moved with one actuator and locks the position of all of the tubes relative to suction box 151. The locking plate can be isolated from the suction tube springs 164 either by placing them inside the suction box or using another separator plate or bushings, etc.

In recapitulation, holding a variety of 3-D object sizes for printing thereon is accomplished with a generic holder that includes an array of springs loaded suction cups mounted to a movable carriage that moves the objects past printheads of a device that prints on the objects. The generic holder includes a vacuum plenum connected to the suction cups and at least one valve to self-regulate the airflow if a suction cup is not covering the object. The array is pivotably attached to the carriage so it can face downward or horizontally for object loading and vertically for printing. A staging platen is provided that uses gravity and movable datum to ensure repeatability of parts placement. The carriage pushes the array of spring loaded suction cups into contact with the object on the staging platen with some of the suction cups not being in contact with the object. Vacuum is then applied to adhere the object to the contacting suction cups. A locking plate is then actuated to remove the degree of freedom the springs provide. Afterwards, the carriage moves the array upward lifting the object while simultaneously pivoting the array and object into a position parallel with an array of ink jets for printing thereon. After printing the object is set back onto the staging platen and released from the suction cups and the carriage then moves the suction cups up to allow object unload and reload.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An object holder for a 3-D printing system, comprising:
    a vacuum box, said vacuum box including a bottom plate and openings therein;
    a locking plate attached to and having openings therein in line with said openings in said bottom plate;
    a suction array of slidably adjustable tubes adapted to slide within said openings within said vacuum box and locking plate, said slidably adjustable tubes including deformable suction cups attached to one end thereof and caps enclosing opposite ends thereof; and
    springs surrounding each of said suction array of slidably adjustable tubes with one end of said springs resting against said suction cups.

2. The object holder of claim 1, wherein said caps rest against said bottom plate when not contacting an object and another end of each of said springs resting against said locking plate.

3. The object holder of claim 2, wherein each of said caps include an opening therein.

4. The object holder of claim 3, wherein each of said array of slidably adjustable tubes includes a ball positioned in an upper end thereof.

5. The object holder of claim 1, wherein said locking plate includes compliant fingers used to stabilize said array of slidably adjustable tubes as they extend within said vacuum box.

6. The object holder of claim 1, wherein said vacuum box is adapted to be pivoted between horizontal and vertical positions.

7. The object holder of claim 1, wherein said object holder is incorporated into a printer.

8. The object holder of claim 7, including a support member and wherein said object holder is supported by said support member.

9. The object holder of claim 1, including a vacuum plenum connected to said vacuum box.

10. The object holder of claim 9, including a variable valve positioned between said vacuum plenum and said vacuum box.

11. The object holder of claim 10, wherein said variable valve is adapted to allow a first flow rate application of pressure to said vacuum box to acquire an object and then an increased flow rate application of pressure to close off unsealed suction cups by balls positioned within said suction array of slidably adjustable tubes.

12. The object holder of claim 11, wherein said first flow rate application of pressure is a negative gauge pressure of approximately 11.8 psi.

13. An apparatus for holding 3-D objects for printing thereon, comprising:
    an array of suction cups adapted to contact and adhere to an object, said suction cups being attached to a first end of hollow tubes;
    a spring surrounding each of said hollow tubes;
    a cap with an opening therein enclosing a second end of each of said hollow tubes;
    a ball supportably positioned within each of said hollow tubes; and
    a vacuum source for applying vacuum pressure through said hollow tubes to said array of suction cups to attach said array of suction cups to said object.

14. The apparatus of claim 13, including a vacuum box connected to said vacuum source, said vacuum box including a bottom plate and a locking plate attached to said bottom plate; and wherein said cap enclosing said second end of each of said hollow tubes rests on an upper surface of said bottom plate when said hollow tubes are extended into a first position.

15. The apparatus of claim 14, wherein said locking plate includes compliant fingers that stabilize said hollow tubes when contact with an object causes said hollow tubes to be pushed into said vacuum box.

16. The apparatus of claim 14, including a variable valve connected to said vacuum source and said vacuum box that is adapted to allow a first flow rate of vacuum to said vacuum box to acquire said object and a second and increased flow rate of vacuum to said vacuum box move balls into said opening of said caps to close off all un-sealed suction cups.

17. The apparatus of claim 16, wherein said object holder is incorporated into a printer.

18. The apparatus of claim 13, wherein said array of suction cups is adapted to pivot between a first position to acquire an object and a second position for printing to be placed upon said object.

19. The apparatus of claim 13, wherein said spring surrounding each of said hollow tubes has one end positioned against said locking plate and another end positioned against said suction cups.

20. The apparatus of claim 13, including a staging platen for holding objects for acquiring and released by said array of suction cups.

* * * * *